May 21, 1963 EIJI OTSUKA ET AL 3,090,811
SYNTHESIS OF UREA
Filed Oct. 17, 1960
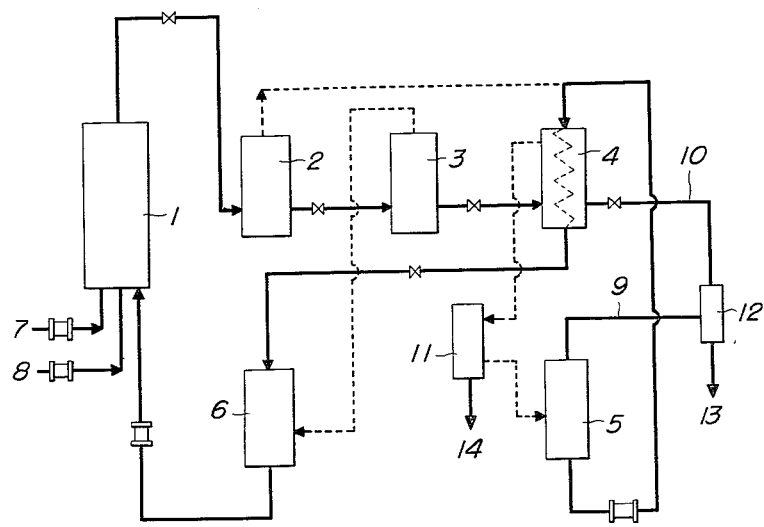
INVENTORS
EIJI OTSUKA, TORU TAKAHASHI and HIROO WATANABE
BY
*Kenderick, Lends Vonach*
ATTORNEYS 3,090,811
SYNTHESIS OF UREA
Eiji Otsuka, Fujisawa-shi, Toru Takahashi, Kamakura-shi, and Hiroo Watanabe, Fujisawa-shi, Japan, assignors to Toyo Koatsu Industries, Incorporated, Tokyo, Japan, a corporation of Japan
Filed Oct. 17, 1960, Ser. No. 62,923
Claims priority, application Japan Oct. 23, 1959
5 Claims. (Cl. 260—555)

This invention relates generally to a process for synthesizing urea, and more particularly it relates to the recovery of heat which is generated upon absorbing in an absorbent unreacted gaseous substances, said unreacted substances being obtained by means of a plurality of consecutive distillations which distils the urea synthesis effluent from a urea synthesis using ammonia and carbon dioxide.

It is well-known in the art to recover the unreacted gaseous ammonia and carbon dioxide formed by the distillation of urea synthesis effluent by absorbing them in an absorbent.

For example, in U.S. Patent 2,116,881 the unreacted gaseous substances are recycled in form of an aqueous solution, while in Japanese Patent 236,181 these are absorbed in an aqueous urea solution. Under these methods enormous heat which is generated upon absorbing the unreacted substances in an absorbent is removed by cooling with water. These are one example in the art which does not employ such a method in recovering the heat. Under P.B. 47773 Fiat Final Report No. 889 (1946) the ex-I.G. Farbenindustrie employed a specific compressor whereby the heat was recovered in form of steam.

A principal object of the present invention is to recover the heat which is generated upon absorbing the unreacted substances derived from urea synthesis in an absorbent and utilize it as part of supply heat to subsequent distillation steps for the urea synthesis effluent.

Generally the unreacted substances contain ammonia and carbon dioxide in an amount corresponding to more than 2 mols ammonia per one mol carbon dioxide. Though this ratio may vary with variations in synthesis process, usually they comprise 3 to 6 mols ammonia per one mol carbon dioxide and further they contain 5 to 1 mols water vapour. Accordingly in absorbing these unreacted substances into an absorbent the following exothermic reactions take place with the generation of enormous heat as shown by $Q_1$, $Q_2$ and $Q_3$ wherein $Q_1=284$ kcal./kg. at 20° C., $Q_2=585$ kcal./kg. at 20° C., and $Q_3=433$ kcal./kg at 25° C. (in liquid phase).

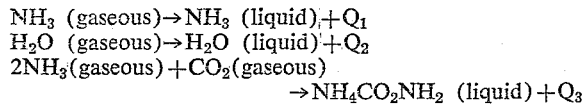

The reason why it is difficult to utilize effectively this enormous heat is due to a phase rule reigning the $NH_3$—$CO_2$—$H_2O$ system or $$NH_2CONH_2—NH_3—CO_2—H_2O$$

system. In recovering the heat in the form of steam, the saturation temperature at a steam recovery pressure (gauge/kg./cm.² being assigned) will be 119.6° C. In order to obtain the steam of the above nature, the temperature on the side of heat supply must be 120° C. plus 20° C. (the latter being the inevitable temperature difference in the zone of heat conduction) totalling 140° C.

In the meanwhile, in order to obtain a satisfactory absorption of the unreacted substances in the absorption system at about 140° C., either the amount of absorbent must be very large or the absorption pressure must be elevated. The former measure would face with a limitation from carrying out total recycle operation. Hence the latter one, namely the selection of a preferred absorption pressure, will attain the objective. As one example, the absorption pressure as well as the composition of the resultant solution from the absorption in the $NH_2CONH_2$—$NH_3$—$CO_2$—$H_2O$ system are shown in Table I. In this instance, it is assumed that a gaseous mixture comprising 7 mols of ammonia, 2 mols of carbon dioxide and one mol of steam are absorbed in an absorbent consisting of 50% by weight urea and 50% by weight water and at a temperature of 140° C.

TABLE I

| Absorption pressure atm. | Composition of solution (percent by weight) resulting from absorption | | |
|---|---|---|---|
| | $NH_3$ | $CO_2$ | $NH_2CONH_2+H_2O$ |
| 10 | 14.8 | 6.8 | 78.4 |
| 20 | 22.5 | 17.0 | 60.5 |
| 30 | 31.3 | 26.9 | 41.8 |
| 40 | 39.2 | 36.8 | 24.0 |

In re-circulating this solution through a urea synthesis autoclave, the content of water or urea plus water should be minimized since it will act against the urea synthesis, and actually, less than 30% (by weight), preferably 20–30% of the recycling solution is preferred. In the aforementioned U.S. Patent 2,116,881 the water content amounts to 35% which forces employing 220° C. and 420 kg./cm.² in urea synthesis in order to maintain an economical urea synthesis efficiency. Whereas, the water content of 20–30% enables to carry out the urea synthesis under a moderate condition of 180° C. and 280 kg./cm.³.

We have succeeded in distilling off the unreacted substances contained in the urea synthesis effluent by a plurality of consecutive distillations and utilising in a low pressure distillation the heat generated upon absorbing in the absorbent the distilled-off gas from the high pressure distillation by means of a plurality of pressure-resistant pipes accommodated in a heat recovery column, without takeng recourse to severe urea synthesis temperature and pressure.

In the following we shall explain a most preferred embodiment of our invention. The unreacted substances are first distilled off in form of a gaseous mixture by high pressure distillation and subsequent low pressure distillation. In this instance a total of 60–80% of the substances are distilled off by a first stage and a second stage high pressure distillations and the remaining 40–20% by a low pressure distillation, these absorption rates being reigned by the subsequent absorption pressure and absorption temperature. Of the high pressure distillations, 20–40% of the unreacted substances are distilled off preferably by the first stage distillation. The distillation pressure of the second stage distillation should be 15–25 atm. which is same as the absorption pressure, with the distillation temperature being 140–150° C. The absorbent causes the unreacted substances to be absorbed therein and as a result, a recycling soltion to be recycled through a urea synthesis reactor is formed. The absorbent comprises water or urea or a mixture of both and it should preferably be equivalent to 20–30% by weight of the resultant solution in consideration of high pressure absorption pressure and for the prevention of possible depositing out of solids in said solution, though the amount of absorbent should preferably be as small as possible. The absorption condition is: a pressure of 15–25 atm. and a temperature in the neighbourhood of 100°

C. Now it is assumed that the solution of the above nature is composed of 80 parts comprising $NH_3$ plus $CO_2$; that the absorbent totals 20 parts; that 80% of the unreacted substances are distilled off by two stage high pressure distillations and the remaining 20% by a low pressure distillation. In these circumstances the amount of unreacted substances to be distilled off by low pressure distillation must be 16 parts (80 parts × $^{20}/_{100}$). In order to supply the low pressure distillation with the heat generated upon absorption of the unreacted substances obtained from the high pressure distillation for the purpose of distilling off this 16 parts, the amount of unreacted substances derived from the 1st stage distillation must at least be 16 parts. Accordingly, in order to first absorb in 20 parts of absorbent 16 parts unreacted substances comprising ammonia and carbon dioxide which have been obtained from the low pressure distillation and secondly to absorb in the resultant solution from said absorption further 16 parts of unreacted substances of similar composition which have been obtained from the 1st stage high pressure distillation, 32 parts of the unreacted substances must be absorbed in 20 parts of absorbent in the heat recovery zone (zone wherein the unreacted substances from the 1st stage high pressure distillation to be absorbed in an absorbent).

Interrelations between the heat recovery conditions and the heat recovery pressure are: 20 atm. for the high pressure absorption zone (comprising 80 parts $NH_3+CO_2$ and 20 parts absorbent at 100° C.; 26 atm. for the heat recovery zone (comprising 32 parts $NH_3+CO_2$ and 20 parts absorbent at 130° C.) wherein the total distillation by the 1st and 2nd stages amounts to 80%. Table II also show interrelations at various distillation ratios wherein the pressure of the high pressure absorption and of the 2nd stage distillation is commonly 20 atm.

TABLE II

| Total distillation ratio in high pressure distillations (percent) | Heat recovery temperature (° C) | Heat recovery condition (in parts) | | Pressure required for the heat recovery (atm.) |
| --- | --- | --- | --- | --- |
| | | $NH_3+CO_2$ | Absorbent | |
| 80 | 130 | 32 | 20 | 26 |
| 70 | 130 | 48 | 20 | 36 |
| 60 | 130 | 64 | 20 | 58 |

From the above table it is known that the pressure required for the first stage high pressure distillation must at least be equal to the figures on the extreme right column of the table. Since 20 atm. is assigned to the 2nd stage distillation, the pressure of the 1st stage distillation must be more than 1.3 times as much as that of the second stage.

In the above table the heat recovery temperature is commonly 130° C. In this connection, in proportion as the temperature is elevated the pressure required for the heat recovery also increases. As for the composition of the absorbent, no prominent variation in results will take place whether it is composed of merely water or 50% by weight water and 50% by weight urea. However, such an absorbent wherein the urea content is more than 50% will take a higher value of heat recovery pressure than exhibited on the table. Furthermore, when the pressure of the 2nd stage distillation is 15 atm., the composition of the solution resulting from absorption will be 75 parts of $NH_3$ plus $CO_2$ and 25 parts of absorbent, namely the amount of absorbent will increase compared with if the pressure of the 2nd stage distillation is 20 atm. and consequently the pressure required for the heat recovery, namely the pressure of the 1st stage high pressure distillation will proportionately be lowered to 20 atm. at its minimum. This also proves that the pressure of the 1st stage distillation may be more than 13.5 times that of the 2nd stage distillation.

To summarise the above findings, this invention may be embodied by (a) carrying out high pressure distillation in 2 stages (whereas the conventional method employs only one stage distillation), (b) carrying out the first stage distillation at a pressure more than 1.3 times as much as that of the 2nd stage distillation, (c) making the amount of unreacted substances distilled off by the first stage distillation equal to or in slight excess of the amount of unreacted substances distilled off by a low pressure distillation in consideration of heat balance, (d) thus utilising in the low pressure distillation the heat generated upon absorbing into an absorbent the unreacted substances from the first stage high pressure distillation. Carrying out the high pressure distillation in two separate stages may be easily done by lowering the pressure at which the urea synthesis effluent leaves the reactor, consecutively in 2 stages. Furthermore, since the overall distillation ratio is determined on the pressure of the second stage distillation, distillation by way of 2 stages does not deteriorate the distillation ratio compared with prior art one.

In the following we shall describe advantages and results from the instant invention. Under the prior art steam is mostly employed in distillation in urea synthesis and particularly in low pressure distillation since most of the heat required for high pressure distillation is supplied from the sensible heat contained in urea synthesis effluent. Accordingly our invention has resulted in a saving of steam by over one-third of what had been required in the prior method. In addition to this, it has brought about the following advantages: (a) much decrease in the amount of heat required to be removed in high pressure absorption. This means lessening of the area to be cooled and of the amount of necessary cooling water; (b) where an amount of ammonia in stoichiometrically much excess with respect to carbon dioxide is employed in the urea synthesis, the still unabsorbed ammonia after heat recovery may be condensed and recovered at a higher pressure than the conventional range of 10–20 atm. This means a saving of the condensing device.

In the following we shall describe some modifications of this invention which should be construed as being within the scope of the invention.

An example is to carry out heat recovery first, and subsequently absorption of the unreacted substances derived from low pressure distillation (namely, the order of treatment is the reverse of the standard type one). In this instant generally no difference in pressure between the first stage and the second stage distillations is needed, since a satisfactory amount of absorbent can be employed for the unreacted gaseous substances to be absorbed upon the heat recovery. Accordingly there occurs no need for dividing the high pressure distillation in the first and the second stage ones provided that over twice the amount of unreacted substances as much as those derived from the low pressure distillation could be absorbed in the low pressure distillation. Such a measure would be highly difficult, and to carry out compression of the unreacted substances would be necessary.

Another example of modification is to take out the heat required for absorbing unreacted substances derived from the first stage distillation in form of steam and to utilize it in the low pressure distillation. The use of such a heat medium may be easily inferred from the present invention, and the embodiment would necessitate an increase in devices. Hence this could not be an ameliorated embodiment of the standard type one.

As has been described, in carrying out the instant invention the so-called total recycling of the unreacted substances is not prerequisite. However, in any case at least the solution resulting from high pressure absorption must be re-circulated through the urea synthesis reactor. Generally where a total recycle method is employed the unreacted substances from the synthesis effluent must be distilled off by a high and a low pressure distillations and the absorption of these substances must be carried out by a high and a low pressure absorptions. Where a total recycle method is not employed the low pressure absorption may be obviated. In this instance the recovery of heat may be effected far more easily than where a total recycle method is employed.

In the following will be described an example embodying the present invention in conjunction with a drawing (FIG. 1) which illustrates a flow diagram of one system according to the invention.

*Example*

132 tons of $CO_2$ (7) and 102.3 tons of $NH_3$ (8) were fed in a urea synthesis autoclave 1 with a plunger pump under 220 atm. and at 190° C.

Coincidentally a solution withdrawn from a high pressure absorber 6 and comprising 71.4 tons of urea, 77.1 tons of water, 244 tons of $NH_3$ and 157 tons of $CO_2$ was fed in the autoclave 1 with the same plunger pump as aforementioned. The resulting solution had a 46% excess of ammonia in stoichiometrical quantity with respect to carbon dioxide and the overall conversion efficiency as measured by the conversion of the total carbon to urea was 54%. A urea synthesis effluent comprising 252 tons of urea, 131 tons of water, 244 tons of ammonia and 157 tons of $CO_2$ was conducted to a first stage high pressure still 2 whereby 36% of the unreacted gaseous mixture of $NH_3$ and $CO_2$ was distilled off at a temperature of 151° C. and a pressure of 37 atm. The distillation was effected without employing steam and with the sensible heat contained in the effluent.

Then the effluent was further conducted to a second stage high pressure still 3 at 18 atm. and 150° C. with an addition of steam whereby 44% of the unreacted substances was distilled off, the overall distillation ratio by the high pressure distillation amounting to 80%.

The effluent at the outlet of the second stage high pressure still 3 comprised 252 tons of urea, 111.1 tons of water, 48.8 tons of $NH_3$ and 31.4 tons of $CO_2$.

The above effluent was conducted to a heat recovery column (low pressure still) 4 where distillation was effected at 2 atm. and 120° C. thereby distilling off the remaining 20% of the unreacted substances and the resultant urea solution 10 comprised 252 tons of urea, 50 tons of water, 1.7 tons of $NH_3$ and 2.2 tons of $CO_2$.

The solution was subjected to crystallisation by a crystalliser 12 cooled to 35° C. thereby depositing out 180 tons of crystalline urea 13 and simultaneously obtaining a mother liquor 9 comprising 71.4 tons of urea, 50 tons of water, 1.7 tons of $NH_3$ and 2.2 tons of $CO_2$. The mother liquor was conducted to a low pressure absorber 5. The unreacted substances distilled off by the heat recovery column were absorbed in said mother liquor in the low pressure absorber whereby a solution comprising 71.4 tons of urea, 61.2 tons of water, 47.1 tons of $NH_3$ and 29.2 tons of $CO_2$ resulted. The solution was compressed to 37 atm. and was brought into contact in the heat supply zone of the heat recovery column 4 with the unreacted gaseous mixture which had been distilled off by the first stage high pressure still whereby the latter was absorbed in the solution.

As a result of said absorption a solution comprising 71.4 tons of urea, 63.5 tons of water, 134.9 tons of $NH_3$ and 85.7 tons of $CO_2$ was obtained at an absorption pressure of 37 atm. and an absorption temperature of 143° C. The heat thus generated was utilised in the low pressure distillation. Accordingly the heat recovery column did not require steam for the distillation.

The above solution was again reduced in pressure to 18 atm. and it was conducted into a high pressure absorber 6 where it was further cooled and was caused to absorb the whole unreacted substances at 18 atm. and 100° C. Thereby a solution comprising 71.4 tons of urea, 77.1 tons of water, 244 tons of $NH_3$ and 157 tons of $CO_2$ resulted. It was recirculated with a plunger pump through the autoclave 1. The water content formed in the urea synthesis was also distilled off by the heat recovery column and thereafter it was removed in form of liquid water 53.9 tons 14 in a dehumidifier 11 of special construction. For the sake of comparison, the amount of steam required for the urea synthesis under the present invention was 1.36 tons per ton urea. (Prior to the installation of the heat recovery column 4 the necessary steam per ton urea amounted to 2.13 tons.) Furthermore the cooling area and the amount of cooling water in the high pressure absorber 6 were decreased by 35% and 41% respectively.

What is claimed:
1. In a cyclic process for the synthesis of urea by heating ammonia and carbon dioxide at urea-forming temperatures and pressures in a urea synthesis zone, subjecting the resulting urea synthesis effluent from said synthesis zone to distillation in a plurality of distillation zones arranged in a series, thereby separating from each other aqueous urea solution and unreacted substances contained in said effluent, separating the latter substances in the form of a gaseous mixture of ammonia, carbon dioxide and water vapor, absorbing and condensing said gaseous mixture in an absorbent selected from the group consisting of water and aqueous urea solution, and returning the thus-obtained absorbate to said urea synthesis zone, the improvement which comprises:
(a) subjecting the effluent from the synthesis zone successively to a first and a second high pressure distillation at a pressure below that existing during the urea synthesis, the pressure of the second being below that of the first distillation, and thereafter to a third pressure distillation at a pressure below that of the second pressure distillation;
(b) absorbing resulting gaseous mixture of ammonia, carbon dioxide and water vapor obtained from said first distillation in an absorbent selected from the group consisting of water and aqueous urea solution; and
(c) recycling the absorbate resulting from (b) and having a high heat content into heat transfer contact with the effluent during said third pressure distillation, and then to the synthesis zone, thereby utilizing in said third distillation absorption heat transferred from said absorbate to said effluent.

2. In a cyclic process for the synthesis of urea by heating ammonia and carbon dioxide at urea-forming temperatures and pressures in a urea synthesis zone, subjecting the resulting urea synthesis effluent from said synthesis zone to distillation in a plurality of distillation zones arranged in series, thereby separating from each other aqueous urea solution and unreacted substances in the form of a gaseous mixture of ammonia, carbon dioxide and water vapor, absorbing and condensing said gaseous mixture in an absorbent selected from the group consisting of water and aqueous urea solution, and returning the thus-obtained absorbate to said urea synthesis zone, the improvement which comprises:
(a) subjecting the effluent from the synthesis zone successively to a first pressure distillation at a pressure of from 13 to 40 atmospheres and at 140 to 155° C., then to a second pressure distillation at a pressure of from 10 to 25 atmospheres at 140 to 155° C., and then to a third pressure distillation at from 1 to 3 atmospheres and 110 to 130° C.;
(b) absorbing the resulting gaseous mixture of ammonia, carbon dioxide and water vapor obtained from said first distillation in an absorbent selected from the group consisting of water and aqueous urea solution at a pressure of from 13 to 40 atmospheres and 130 to 150° C.; and (c) recycling the absorbate resulting from (b) and having a high heat content into heat transfer contact with the effluent during said third distillation and further into the synthesis zone, thereby utilizing in said third distillation absorption heat transferred from said absorbate to said effluent.

3. In a cyclic process for the synthesis of urea by heating ammonia and carbon dioxide at urea-forming temperatures and pressures in a urea synthesis zone, subjecting the resulting urea synthesis effluent from said synthesis zone to distillation in a plurality of distillation zones arranged in series, thereby separating from each other aqueous urea solution and unreacted substances in the form of a gaseous mixture of ammonia, carbon dioxide and water vapor, absorbing and condensing said gaseous mixture in an absorbent selected from the group consisting of water and aqueous urea solution, and returning the thus-obtained absorbate to said urea synthesis zone, the improvement which comprises:

(a) subjecting the effluent from the synthesis zone successively to a first and a second high pressure distillation at a pressure below that existing during the urea synthesis, the pressure of the second being below that of the first distillation, and thereafter to a third pressure distillation at a pressure below that of the second pressure distillation;

(b) absorbing the resulting gaseous mixtures of ammonia, carbon dioxide and water obtained from said first and said third distillation, respectively, in a common absorbent selected from the group consisting of water and aqueous urea solution; and (c) recycling the absorbate resulting from (b) and having a high heat content into heat transfer contact with effluent during said third pressure distillation, and then to the synthesis zone, thereby utilizing in said third distillation absorption heat transferred from said absorbate to said effluent.

4. In a cyclic process for the synthesis of urea by heating ammonia and carbon dioxide at urea-forming temperatures and pressures in a urea synthesis zone, subjecting the resulting urea synthesis effluent from said synthesis zone to distillation in a plurality of distillation zones arranged in series, thereby separating from each other aqueous urea solution and unreacted substances contained in said effluent, separating the latter substances in the form of a gaseous mixture of ammonia, carbon dioxide and water vapor, absorbing and condensing said gaseous mixture in an absorbent selected from the group consisting of water and aqueous urea solution, and returning the thus-obtained absorbate to said urea synthesis zone, the improvement which comprises:

(a) subjecting the effluent from the synthesis zone successively to a first and a second high pressure distillation at a pressure below that existing during the urea synthesis, the pressure of the second being below that of the first distillation, and thereafter to a third pressure distillation at a pressure below that of the second pressure distillation;

(b) subjecting the aqueous urea solution resulting from the third distillation to crystallization and separating the resulting crystalline urea from its mother liquor;

(c) absorbing both the gaseous mixtures of ammonia, carbon dioxide and water obtained from said first and said third distillation, respectively, in said mother liquor;

(d) recycling the absorbate resulting from (c) and having a high heat content into heat transfer contact with the effluent during said third distillation and then to the synthesis zone, thereby utilizing in said third distillation absorption heat transferred from said absorbate to said effluent.

5. In a cyclic process for the synthesis of urea by heating ammonia and carbon dioxide at urea-forming temperatures and pressures in a urea synthesis zone, subjecting the resulting urea synthesis effluent from said synthesis zone to distillation in a plurality of distillation zones arranged in series, thereby separating from each other aqueous urea solution and unreacted substances contained in said effluent, separating the latter substances in the form of a gaseous mixture of ammonia, carbon dioxide and water vapor, absorbing and condensing said gaseous mixture in an absorbent selected from the group consisting of water and aqueous urea solution, and returning the thus-obtained absorbate to said urea synthesis zone, the improvement which comprises:

(a) subjecting the effluent from the synthesis zone successively to a first and a second high pressure distillation at a pressure below that existing during the urea synthesis, the pressure of the second being below that of the first distillation, and thereafter to a third pressure distillation at a pressure below that of the second pressure distillation;

(b) subjecting the aqueous urea solution resulting from the third distillation to crystallization and separating the resulting crystalline urea from its mother liquor;

(c) absorbing both the gaseous mixtures of ammonia, carbon dioxide and water obtained from said first and said third distillation, respectively, in said mother liquor;

(d) recycling the absorbate resulting from (c) and having a high heat content into heat transfer contact with the effluent during said third distillation, thereby utilizing in said third distillation absorption heat transferred from said absorbate to said effluent; and (e) absorbing the gaseous mixture of ammonia, carbon dioxide and water vapor obtained from said second distillation under pressure in the absorbate resulting from (d) until the water content is only maximally 30% by weight and recycling the thus-enriched absorbate to the synthesis zone.

References Cited in the file of this patent

UNITED STATES PATENTS 2,116,881     Ropp _____ May 10, 1938
2,744,133     Cramer _____ May 1, 1956

FOREIGN PATENTS 23,939     Great Britain _____ Dec. 11, 1914

OTHER REFERENCES

Cook: Chem. Eng. Progress, volume 50, No. 7 (1954), pages 327–31.